(No Model.)
J. A. BERG.
HORSE DETACHER.
No. 359,763. Patented Mar. 22, 1887.
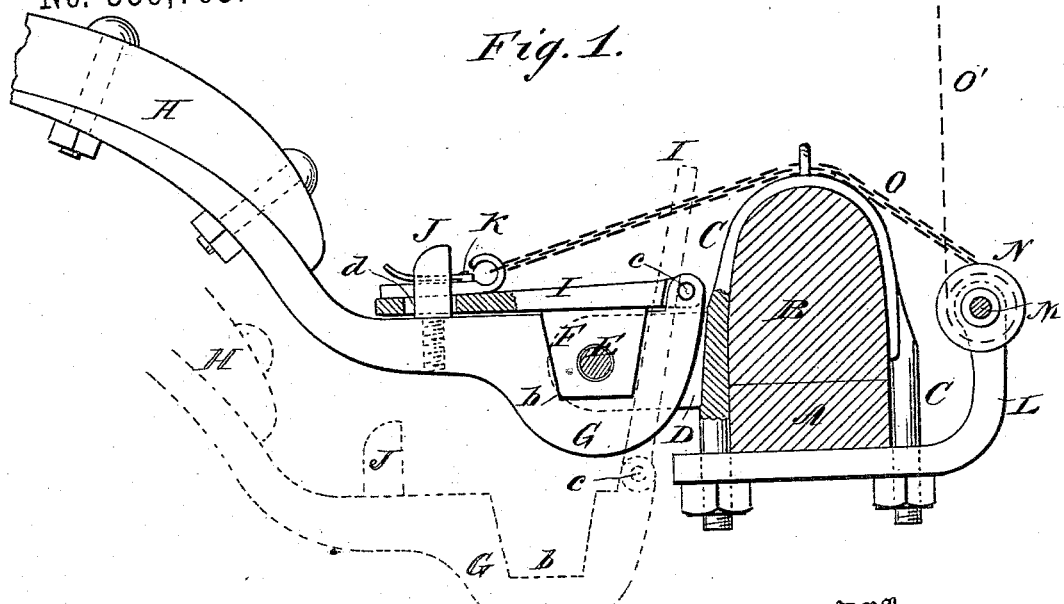
Fig. 1.
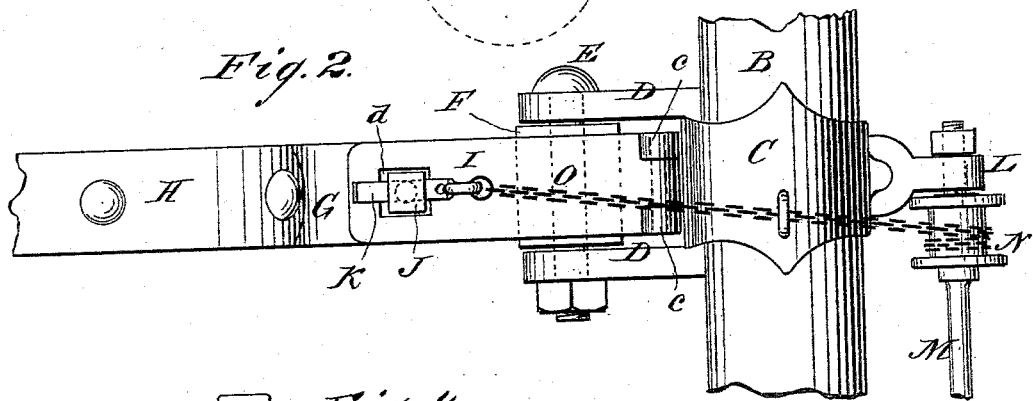
Fig. 2.
Fig. 4.
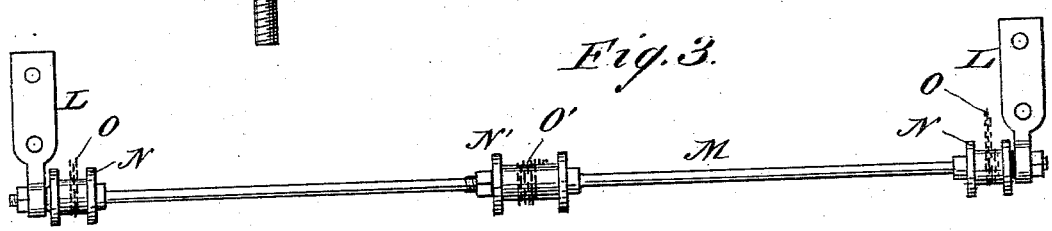
Fig. 3.
WITNESSES:
Donn Twitchell
Jno. Mathew Ritter
INVENTOR:
J. A. Berg
BY Munn & Co
ATTORNEYS.

UNITED STATES PATENT OFFICE.

JOHN ADAM BERG, OF ASHBURTON, NEW ZEALAND.

HORSE-DETACHER.

SPECIFICATION forming part of Letters Patent No. 359,763, dated March 22, 1887.

Application filed July 27, 1885. Renewed September 16, 1886. Serial No. 213,743. (No model.)

*To all whom it may concern:*

Be it known that I, JOHN ADAM BERG, of Ashburton, New Zealand, have invented certain new and useful Improvements in Thill-Couplings, of which the following is a full, clear, and exact description.

This invention consists in a shaft or thill coupling for wagons and other vehicles, substantially as herein shown and described, and pointed out in the claims, and whereby increased facility is afforded for detaching the shafts or pole of the vehicle, when required, and a firm and substantial coupling is obtained.

Reference is to be had to the accompanying drawings, forming part of this specification, in which similar letters of reference indicate corresponding parts in all the figures.

Figure 1 represents a partially-sectional side elevation showing my improved thill-coupling as applied to the axle and shafts of a vehicle, in part also representing by dotted lines the position of certain parts when detaching the shaft or shafts. Fig. 2 is a plan view of the same; Fig. 3, a plan view of certain drum and chain devices for releasing the shafts when requiring to detach them, and Fig. 4 a view of a slotted pin used in the coupling when securing the shafts in place.

A indicates the axle of the vehicle, and B the usual bed-piece mounted thereon. C is one of the axle-clips provided in front with projecting jaws or prongs D D, and E is the clip-bolt arranged to pass through said jaws and through a brass or bearing, F, made either whole or divided, and arranged to sit within a recess, b, open at its top in a solidly-made clip, G, permanently secured at its forward end to the shaft or thill H. This clip G, which passes up between the jaws D D when the thill is attached, has pivoted or hinged to the upper portion of its rear end, as at c, a latch, I, which is provided with a slot, d, in front that passes over and receives through it, when the latch is closed, a slotted pin, J, projecting from the top of the clip G, for holding the thill securely to its place in the coupling, by means of a sliding bolt or catch having a spring on its upper face, the two forming a spring-key, K, which is passed over the latch and through the slot in the pin J. Both shafts or thills are similarly secured and provided with like couplings.

When it is required to detach the shafts, the spring-keys K are drawn out from the couplings—that is, from out of the slotted pins J—when the shafts will be free to drop, as shown by dotted lines in Fig. 1, the latches I flying upward to enable them to pass down between the jaws D D of the axle-clip. This releasing of the shafts from their couplings is provided for as follows: In rear of the axle A, and connected with it by brackets or stays L L, is a rotatable cross-shaft, M, having its bearings in said stays, and having secured on it, near its opposite ends, drums N N, on which are wound ropes or chains O O, that are connected at their opposite ends with the detachable spring-keys K. Said shaft M has also secured on it in the center of its length another drum, N', from which a rope or chain, O', wound thereon passes up to within easy reach of the driver when on his seat in the vehicle. By pulling on the chain O' the chains O O are made to withdraw the spring-keys K from the slotted pins J, with which they engage, thus releasing the latches I from their locking hold of the thill-clips G on the bearings F, and permitting of the thills or shafts instantly or quickly falling off or severing connection with the axle-clips; and as this may be done by the driver from his seat, a great protection will be afforded against accident in case of the horse or horses running away.

Having thus described my invention, what I claim as new, and desire to secure by Letters Patent, is—

1. The combination, with the axle-clip having jaws D, the bolt E, passed therethrough, and the bearing-block F on the bolt between the jaws, of the thill-iron G, formed with a recess, b, in its upper edge to receive the bearing-block F, a latch, I, hinged to the rear upper end of the thill-iron and having an opening, d, in its forward end, the slotted pin J, projecting up from the thill-iron G to enter the opening d, and a locking-bolt engaging the opening in the pin J and adapted to be operated from the vehicle, substantially as described.

2. In a thill-coupling, the thill-iron G, having a recess, b, in its upper edge, the latch I, hinged to the rear upper end of the said iron and having an opening, d, in its opposite end, the pin J, adapted to enter the opening d and having an aperture, and the sliding locking-bolt having a spring secured to it, thereby forming a spring-key, K, held by frictional contact within the opening in the pin J, substantially as set forth.

3. The combination, with the thill-coupling of the character described, having latches and releasing bolts or catches, of a shaft, M, having end drums, N, chains O, passing from the releasing bolts or latches to said drums, an intermediate drum, N', and a chain wound around the same and adapted to be operated from the vehicle to which the couplings are attached, substantially as set forth.

4. The combination, with the clips C C and a thill-coupling of the character described having a releasing bolt or catch, of the brackets L L on the lower ends of the clips and bent upward at their rear ends, and the shaft M, journaled in said ends of the clips and having the drums N N N' and chains O O O', all constructed and arranged substantially as set forth.

JOHN ADAM BERG.

Witnesses:
  A. HENRY HARDECKE,
    *Hotel Keeper, Christ Church.*
  CHAS. W. SYMOND,
    *Clerk.*